United States Patent [19]
Schulman

[11] 3,980,243
[45] Sept. 14, 1976

[54] FLEXURE MOUNT FOR COIL WINDING DEVICE
[75] Inventor: David A. Schulman, Hopkins, Minn.
[73] Assignee: Possis Corporation, Minneapolis, Minn.
[22] Filed: June 12, 1975
[21] Appl. No.: 586,287

[52] U.S. Cl. ............................. 242/7.05 B; 269/256
[51] Int. Cl.² ........................................ H02K 15/04
[58] Field of Search ................. 242/7.05 B, 7.05 R, 242/7.05 A, 7.05 C; 269/25, 256, 157, 86, 87

[56] References Cited
UNITED STATES PATENTS

| 156,293 | 12/1874 | Pitt | 269/157 X |
|---|---|---|---|
| 770,669 | 9/1904 | Bostick | 269/157 X |
| 2,491,972 | 12/1949 | Halote | 269/87 X |
| 2,627,379 | 2/1953 | Moore | 242/7.05 B |
| 3,477,686 | 11/1969 | Engelsher et al. | 269/157 X |

Primary Examiner—Jerry W. Myracle
Attorney, Agent, or Firm—Burd, Braddock & Bartz

[57] ABSTRACT

An apparatus for winding coils of wire on the core of an armature having a pair of rotatable wire winding members rotatably mounted on first and second housings. A first pair of plate beam assemblies yieldably mounts the first housing on the support. A second pair of plate beam assemblies yieldably mounts the second housing on the support. The plate beam assemblies locate the wire winding members in wire winding positions adjacent the core of the armature. A control unit connected to each housing is operable to move the housings to selected positions by flexing the plate beam assemblies. The control unit has a fluid motor and linkages that are operable to move the housings and wire winding members away from the core so that the wound armature can be removed from the apparatus.

51 Claims, 9 Drawing Figures

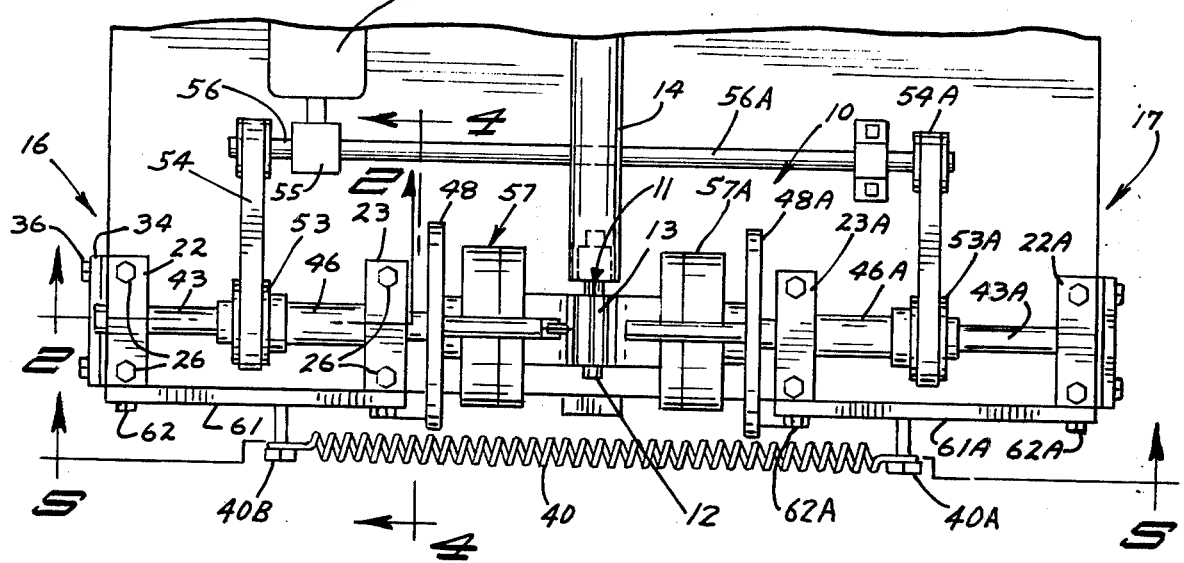
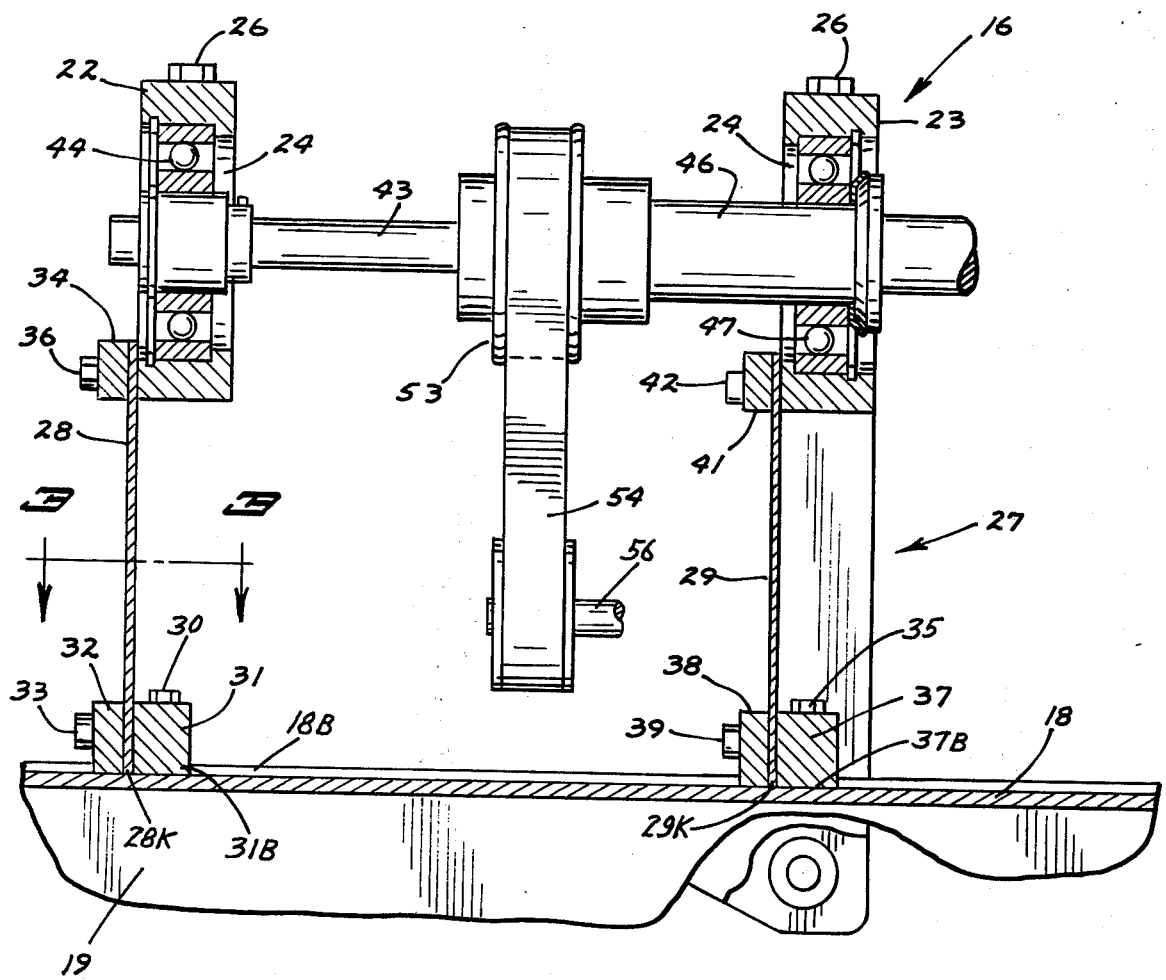

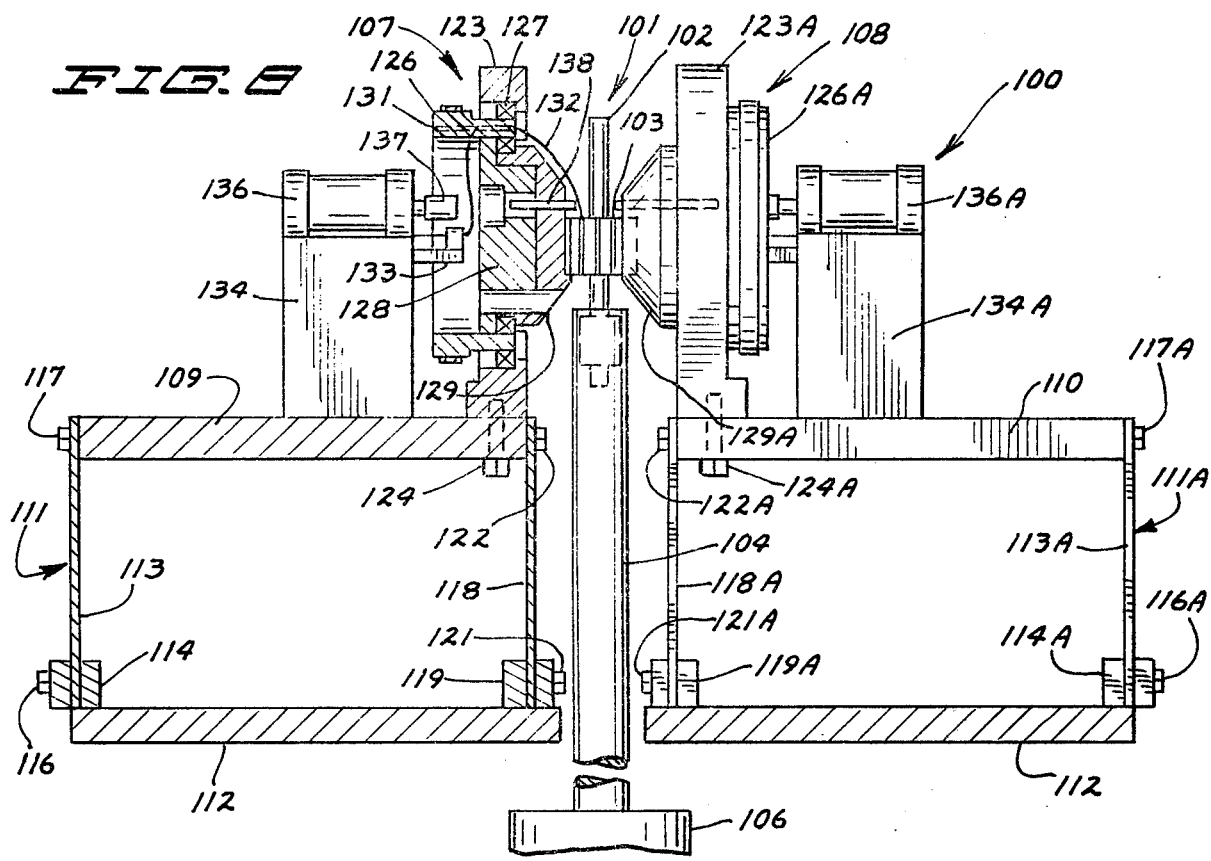
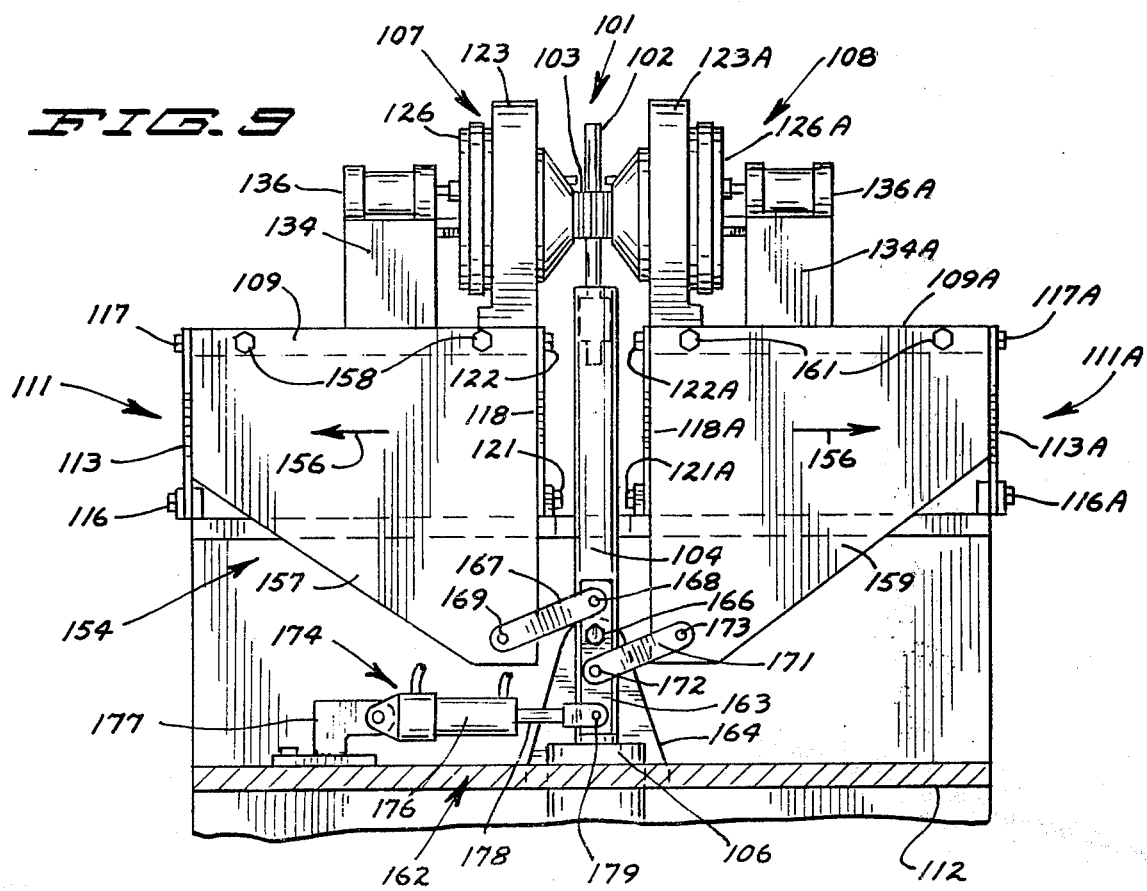

FLEXURE MOUNT FOR COIL WINDING DEVICE

BACKGROUND OF INVENTION

Leaf springs are commonly used in vibratory systems to isolate vibrations. A plurality of leaf-type springs have been used to support the receptacle of a vibratory conveyor. Burgess discloses in U.S. Pat. No. 2,985,280 a vibratiing conveyor supported on a plurality of leaf springs. Leaf springs have also been used in punch machines to hold a work supporting structure, as the structure for mounting the punch. Rabinow et al disclose in U.S. Pat. No. 3,123,290 a punch having a pair of cantilever spring members connected to a punch block. A similar structure is shown by Frohrib in U.S. Pat. No. 3,742,800. Gartner in U.S. Pat. No. 2,727,122 shows a welder having electrodes supported by cantilever spring members.

Armature winding machines are equipped with flyer structures that rotate to wind coils of wire on an armature core. After the winding procedure has been completed, the wound core must be unloaded from the machine and replaced with an unwound core. The wire guiding chucks or shrouds of the machine must be moved away from the core to permit the armature to be readily removed from the machine. The machine must be equipped with linearly or laterally movable flyers and/or shrouds which can be moved to a release position relative to the core of the armature. When a new and unwound armature is put into the machine, the shrouds and wire winding flyers must be moved back to their wire winding position. Linearly movable structures have a degree of play which must be compensated for so that the flyers and chucks can be accurately positioned adjacent the cores at all times. The flyer structure must be rotated during the winding operation. The drive mechanism for rotating the flyers must be laterally moved during the movement of the flyers and shrouds to their release position. This requires a specifically designed drive structure which is costly to manufacture and occupies space in the machine.

SUMMARY OF INVENTION

The invention is directed to an object positioning apparatus that utilizes flexure means to mount the object on a support. More specifically, the invention is directed to an armature wire winding apparatus having means to wind wire onto the core of an armature and flexure means to mount the wire winding means on a support. A control means is operable to move the wire winding means to a release position against the biasing force of the flexure means and against other biasing means. When the force of the control means is released and reversed, the biasing means returns the wire winding means to the wire winding position adjacent the core of the armature.

The flexure means includes plate beam assemblies that are secured to the support and housing structure of the armature winding means. The control means includes a plate connected to the housing and a fluid motor operable to move the plate and the housing to a release position against the biasing force of the plate beam assemblies and against other biasing means. The fluid motor is operable to apply a reverse force to the plates whereby the housings and wire winding means are returned to their initial wire winding positions.

An object of the invention is to provide a flexure mounting structure for the flyers and chucks of an armature winding machine that are operable to positively position the flyers and chucks in a wire winding position. Another object of the invention is to provide flexible plate beam assemblies for mounting the wire winding structure of an armature winding machine which does not have significant play and accurately repositions the chucks in operative relation adjacent the sides of a core. A further object of the invention is to provide a plate beam mounting assembly for an armature core winding machine that can be flexed in response to an actuation force to separate the chucks from an armature core allowing the apparatus to be unloaded and loaded with a new core or permit the indexing of the armature. A still further object of the invention is to provide an armature winding apparatus with flexure beam mounting means that does not alter the timing of the drive system for the flyers of the armature winding machine. Yet another object of the invention is to provide an armature winding mechanism with a mounting structure that utilizes a minimum amount of space, has a minimum number of parts and can be assembled with a minimum of time and labor in comparison with previous designs. Yet another object of the invention is to provide a flexure mount for an object having flexible plate beams that can be easily and quickly assembled on a machine and can be replaced with a minimum of time and cost. Still another object of the invention is to provide a flexure mount structure for wire winding apparatus of an armature core winding machine that has accurate and repetitive motion, does not require adjustment and does not wear over a long period of time. A still further object of the invention is to provide flexure mount structure for a wire winding apparatus that permits the timing belt to be mounted directly on the winding shaft instead of through a spline, as the flexure mount structure provides slack for the timing belt when it is moved from its drive position. The above objects and other objects and advantages are apparent from the following description.

IN THE DRAWINGS

FIG. 1 is a top plan view of the armature winding apparatus of the invention;

FIG. 2 is an enlarged sectional view taken along the line 2—2 of FIG. 1;

FIG. 8 is a sectional view taken along the line 8—8 of FIG. 6; and

FIG. 9 is an end elevational view taken along the line 9—9 of FIG. 6 looking in the direction of the arrows.

DESCRIPTION OF PREFERRED EMBODIMENTS

Referring to FIG. 1, there is shown an apparatus indicated generally at 10 for winding coils of wire on a slotted core of an armature 11. Armature 11 has a shaft 12 carrying a slotted core 13. A holder 14 supports armature 11 in a horizontal position. The apparatus of the invention is operable to hold objects and locate objects other than armatures in desired positions. The following description is directed to armature winding machines. It is understood that the invention is not limited to armature winding machines. Clamp structures, as vises, latches, locks, material inserting machines and material cutting machines can be equipped with the flexure mount of the invention.

Figure 4:
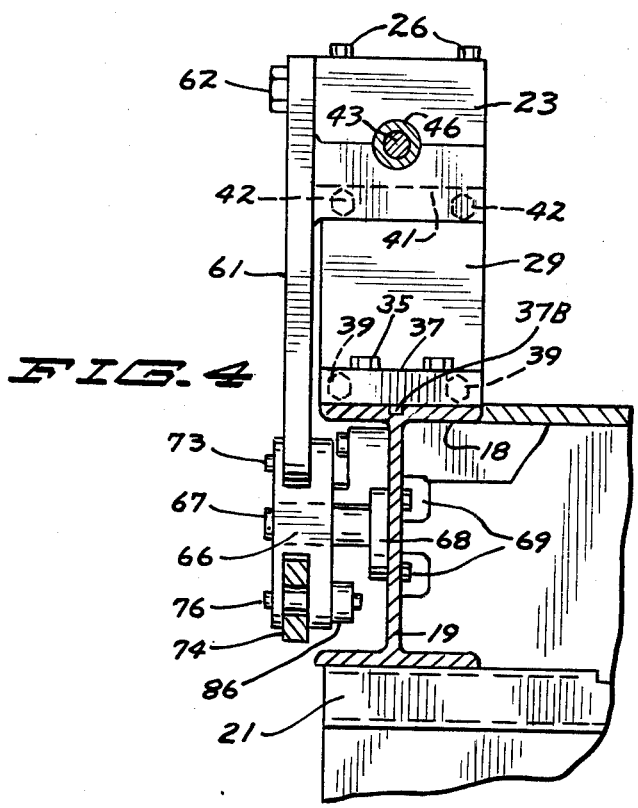
FIG. 4 is a sectional view taken along the line 4—4 of FIG. 1.

Apparatus 10 comprises a first mechanism indicated generally at 16 facing a second mechanism indicated generally at 17. Armature core 13 is located between mechanisms 16 and 17 so that two wires can be simultaneously wound on the slotted armature core 13. Mechanisms 16 and 17 are mounted on a support 18. As shown in FIG. 4, support 18 is a horizontal "I" beam having a generally vertical web 19. Support 18 is mounted on frame structure 21 which locates the mechanisms 16 and 17 at a convenient working height.

Mechanisms 16 and 17 are identical in structure. The following description is specific to the mechanism 16. The corresponding parts of mechanism 17 have identical reference numbers with the suffix A. As shown in FIG. 2, mechanism 16 has upright end members or blocks 22 and 23. Each block 22 and 23 has a top section and a bottom section. Each section has a semicircular cutout providing a hole 24 extended through the block. A plurality of bolts 26 secure the top sections of the block to the bottom sections of the blocks.

Figure 3:
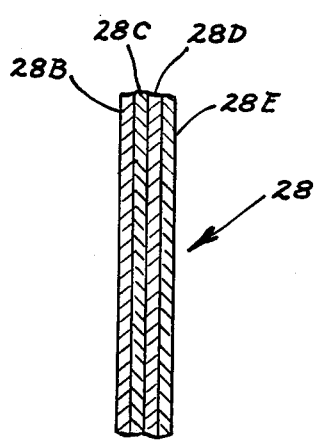
FIG. 3 is an enlarged sectional view taken along the line 3—3 of FIG. 2.

Blocks 22 and 23 are connected to support 18 with a mounting flexure means indicated generally at 27. Flexure means 27 comprises a first flat upright plate beam assembly 28 and a second flat upright plate beam assembly 29. As shown in FIG. 3, assembly 28 is comprised of a plurality of flat plate members 28B, 28C, 28D and 28E. The number and thickness of each plate member can vary. Also, assembly 28 can be a single plate member. Members 28B, 28C, 28D and 28E are metal, preferably steel or similar high strength material.

As shown in FIG. 2, the lower transverse section of plate beam assembly 28 is secured to a first bar 31. Bar 31 has a key 31B located in groove 18B extended along the top of support 18. A plurality of bolts 40 secure bar 31 to support 18. Beam members 28B, 28C, 28D and 28E have short projections, tangs, or keys 28K located in groove 18B. The lower edges of beam members 28B, 28C, 28D and 28E are in engagement with the top surface of support 18. Keys 31B, 28K and groove 18B provide accurate and easy assembly and positioning of beam assembly 28, both vertically and horizontally, on support 18. A second bar 32 accommodating bolts 33 secures the lower section of plate beam assembly 28 to first bar 31. The upper transverse section of plate beam assembly 28 is secured to the lower part of block 22. A transverse bar 34 accommodating fastening means 36, as bolts threaded into the block 22, securely fasten the upper section of plate beam assembly 28 to block 22.

The second plate beam assembly 29 has a lower transverse section located adjacent a first bar 27. Beam assembly 29 has a projection, key or tang 29K located in groove 18B. Bar 37 has a projection, key or tang 37B located in groove 18B. A plurality of bolts 35 secure bar 37 to support 18. A second bar 38 accommodating a plurality of bolts 39 is located opposite the first bar 37. The bolts 39 are threaded into the first bar 37 to fasten the lower transverse section of plate beam assembly 29 to bar 37. A transverse bar 41 is located adjacent the upper transverse portion of plate beam assembly 29. A plurality of bolts 42 extend through bar 41, through the upper section of plate beam assembly 29, and are threaded into the lower end of block 23.

Plate beam assemblies 28 and 29 are flat plate members commonly known as cantilever beams. The beams are secured at their lower ends and are attached to the load, i.e., blocks 22 and 23, at their upper ends. Plate beam assemblies 28 and 29 normally locate the blocks 22 and 23 in a first or selected position wherein blocks 22 and 23 are in side-by-side upright positions. Blocks 22 and 23 can be laterally moved with an external force whereby beam assemblies 28 and 29 are deflected. When the force on blocks 22 and 23 is reversed, the beam assemblies 28 and 29 will return the blocks 22 and 23 to their first or normal positions. A tension coil spring 40, shown in FIG. 1, biases the mechanisms 16 and 17 to their wire winding positions. Anchor bolts 40A and 40B secure opposite ends of spring 40 to plates 61 and 61A. Other types of biasing means can be used to urge the mechanisms to their wire winding positions. Beam assemblies 28 and 29 also support the blocks 22 and 23 on the stationary "I" beam 18.

Blocks 22 and 23 are bearing blocks which accommodate a rotatable shaft 43. Shaft 43 is rotatably mounted in a ball bearing 44 located in hole 24 in block 22. A sleeve 46 is rotatably mounted on shaft 43. Sleeve 46 is carried by a ball bearing 47 located in opening 24 in block 23. Sleeve 46 projects outwardly from block 23 and is secured to a disc 48 having an outwardly directed arms 49 and 51. Arm 49 is a tubular member or flyer that carries a wire 52 around the core 13 so that the wire is wound on the core. Arm 51 is a balancing member to compensate for the weight of arm 49. A pulley 53 is mounted on the portion of the sleeve 46 located between the blocks 22 and 23. A gear box 55 having a first output shaft 56 drives an endless belt 54 to rotate pulley 53. A second output shaft 56A connected to gear box 55 drives a second belt 54A to rotate pulley 53A. Pulleys 53 and 53A are rotated in opposite directions. A fluid motor 60 is operable to transmit power to gear box 55. Other types of drives or power transmissions can be used to rotate the sleeves 46 and 46A. For example, separate motors can be connected to the drive belts 54 and 54A.

Figure 5:
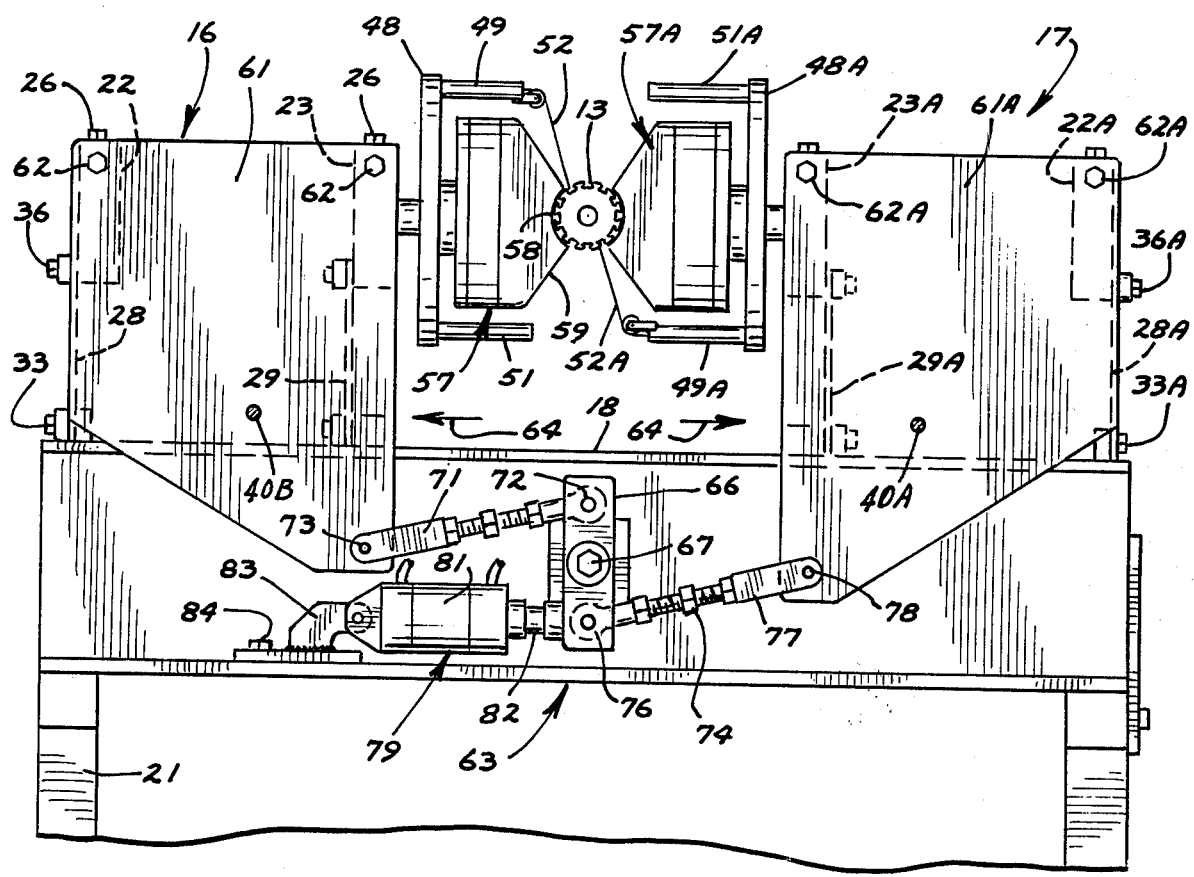
FIG. 5 is a front elevational view taken along the line 5—5 looking in the direction of the arrows as shown in FIG. 1.

A wire guiding assembly or shroud 57 is mounted on the end of shaft 43 adjacent disc 48. As shown in FIG. 5, shroud 57 has an arcuate recess accommodating an arcuate segment of core 13 and converging wire guiding faces 59 for directing the wire 52 into pairs of slots in core 13. Shrouds 57 and 57A also provide a clamp support for core 13.

As shown in FIG. 5, a plate 61 extends between the blocks 22 and 23 and extends downwardly adjacent the side of the support 18. Bolts 62 secure plate 61 to blocks 22 and 23. Bolts 62A secure the side plate 61A to blocks 22A and 23A.

A control mechanism indicated generally at 63, shown in FIG. 5, is used to move mechanisms 16 and 17 in opposite directions, as indicated by arrows 64 to spread shrouds 57 and 57A whereby the armature can be removed from holder 14. Control mechanism 63 works against the biasing forces of the mounting flexure means 27 and the biasing force of spring 40. When the force of the control mechanism 63 acting on side plates 61 and 61A is reversed, the mounting flexure means 27 and spring 40 will return the mechanisms 16 and 17 to their initial positions, locating shrouds adjacent opposite sides of core 13. Control mechanism 63 has a movable member 66 rotatably mounted on a fixed axle 67. Axle 67 is secured to a base 68. A plurality of bolts 69 secure the base 68 to the web 19 of the "I"

beam support 18. A first link 71 is connected with a pivot pin 72 to the top part of member 66. A yoke on link 71 is connected with a pin 73 to a bottom part of side plate 61. Link 71 is a two-piece threaded member which can be rotated to change its effective length. The lower end of member 66 is connected to a second link 74 with a pin 76. Link 74 has a yoke 77 carrying a pin 78 which connects the lower portion of side member 61A to the yoke. Link 74 is identical to link 71.

A fluid motor indicated generally at 79, as an air cylinder, hydraulic cylinder or the like, is used to rotate the member 66 on the axle 67. Motor 79 is connected to control means (not shown) operable to control the operation of the motor in a timed relation with the operation of motor 60. Motor 79 is preferably a double-acting air cylinder 81 carrying a movable piston rod 82. Piston rod 82 is connected to the pin 76, as shown in FIG. 4, whereby the force of the motor is transmitted to the member 66. The opposite end of motor 79 is pivotally mounted on an anchor 83. A plurality of bolts 84 secure the anchor 83 to the "I" beam support 18.

In use, the fluid motor 79 is actuated to extend the piston rod 82 in an outward direction moving the member 66 in a counterclockwise direction about axle 67. The lower end of member 61 moves outwardly in the direction of arrow 64. The force is transmitted through links 71 and 74 to move the side plates 61 and 61A away from each other. Plate beam assemblies 28, 29, 28A and 29A are subjected to equal opposite forces that flex the plate springs. This moves the shrouds 57 and 57A away from each other so that the armature can be removed from between the apparatus.

When the fluid pressure to the motor 79 is reversed, the member 66 will be returned to its upright position. The plate beam assemblies 28, 29, 28A and 29A will return the shrouds 57 and 57A back to the initial armature holding positions in response to the reverse force of the fluid motor 79.

Referring to FIGS. 6–9, there is shown an apparatus for winding coils of wire indicated generally at 100 on an armature 101. Armature 101 has an upright shaft 102 carrying a slotted core 103. The lower end of shaft 102 is releasably held in an upright holder 104. The lower end of the holder is operatively connected to an indexing mechanism such as an electric motor 106. Holder 104 includes a cup member forming part of a commutator shielding and lead moving and guiding unit. The unit is operative to move and guide each ending wire lead which extends from the coil just wound about the shaft and around a selected commutator hook. The entire commutator, except for a selected hook, is shielded to prevent other or previously attached leads from leaving their hooks. An example of this structure is shown in U.S. Pat. No. 3,636,621. The coil leads can be attached to the commutator with the apparatus and method disclosed in U.S. Pat. application Ser. No. 454,678 filed Mar. 25, 1974. Motor 106 is drivably connected to a drive structure (not shown) located within or adjacent holder 104 operable to impart minute increments of rotation and thereby index the core 103 during the winding procedure. The motor is connected to an encoder in the form of an electromechanical device that is used to provide an electronic output in the form of a series of identical electrical impulses identifying minute increments of rotation of the motor shaft. The output of the encoder is fed into a memory bank of a computer that forms part of the control system of the winding machine. Other types of indexing structures can be used to sequentially index the core 103 during the winding procedure.

Apparatus 100 has a first wire winding unit or mechanism 107 located on one side of armature 101 and a second wire winding unit or mechanism 108 located on the opposite side of armature 101. The wire winding units 107 and 108 are identical in structure and operate to simultaneously wind coils of wire onto the core 103. The units 107 and 108 are mounted on table or platform structures 109 and 110 with mounting flexure means indicated generally at 111 and 111A. The mounting flexure means for unit 107 is identical with the mounting flexure means for the unit 108. The following description is directed to the mounting flexure means 111. The mounting flexure means 111A that is identical with mounting flexure means 111 has the same reference numerals with the suffix A.

The mounting flexure means 111 is located above a generally horizontal support or frame 112. The flexure means comprises a first upright plate beam assembly 113 that connects support 112 to the table 109. An anchor or bar 114 is secured to the top of support 112. Support 112 can be provided with slots or keyways to accommodate tangs or keys on the bar 114 and beam assembly 113. This structure can be the same as shown in FIG. 2 as keyway 18B and keys 28K, 29K, 31B and 37B. A plurality of bolts 116 secure the lower transverse section of beam assembly 113 to the anchor 114. A plurality of bolts 117 secure the upper section of beam assembly 113 to the end of table 109. A second plate beam assembly 118 extends between the support 112 and table 109. An anchor or bar 119 secured to support 112 receives a plurality of bolts 121. Bolts 121 secure the bottom section of beam assembly 118 to anchor bar 119. A plurality of bolts 122 secure the upper section of beam assembly 118 to the end of table 109. Beam assemblies 113 and 118 can be single flat and flexible plate members or a plurality of side-by-side flat and flexible plate members. For example, beam assemblies can have the beam structure shown in FIG. 3. The mounting flexure means 111 and 111A can be located in horizontal positions with ends secured to vertical supports. The plate beam assemblies can be vertical or horizontal. Alternatively, the flexure means 111 and 111A can be supported from a stationary overhead structure with the plate beam assemblies extended downward to the housings or object support structures.

The wire winding unit 107 is identical with the wire winding unit 108. The following description is limited to unit 107. Parts of unit 108 that correspond to parts of unit 107 have identical reference numbers with the suffix A.

Figure 6:
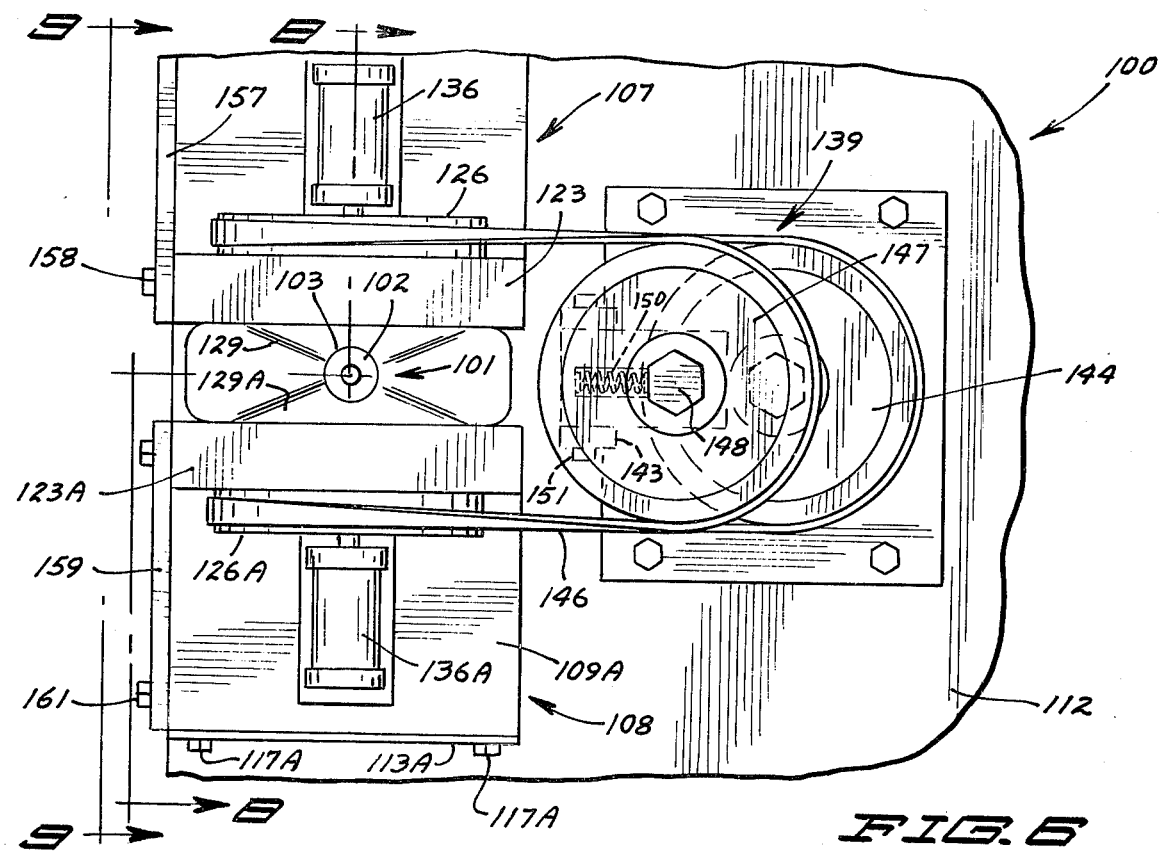
FIG. 6 is a top plan view of a modification of the armature winding apparatus of the invention.

Wire winding unit 107 has an upright housing or block 123 secured to the inner end of table 109 with a plurality of bolts 124. The housing 123 has an annular opening accommodating an annular ring-like member 126. Bearings 127 rotatably mount the annular member 126 on the housing 123. A plate or disc 128 is located within annular member 126. A guide or shroud 129 is secured to plate 128. The shroud 129 has arcuate recesses for accommodating an arcuate segment of core 123, as shown in FIG. 6. The annular member 126 has a longitudinal hole 131 for accommodating wire 132 that is wound on core 103. The wire 132 moves through a wire guide 133 mounted on a stand 134 secured to table 109.

An actuator 136, as a double acting cylinder having a movable plunger 137, is mounted on top of the stand 134. The plunger is movable into engagement with a pair of pivotally mounted jaws 138. Jaws 138 are pivotally mounted on the guide or shroud 129 and function to guide the wire over the end of the core 103. Jaws 138 can be secured to the shrouds 129 and 129A and move with the shrouds to release positions so that the armature 101 can be removed from the machine. Actuators 136 and 136A can be used to operate wire manufacturing mechanisms (not shown) mounted on the shrouds. Alternatively, the actuators 136 and 136A can be removed when jaws 138 are secured to shrouds 129 and 129A.

Figure 7:
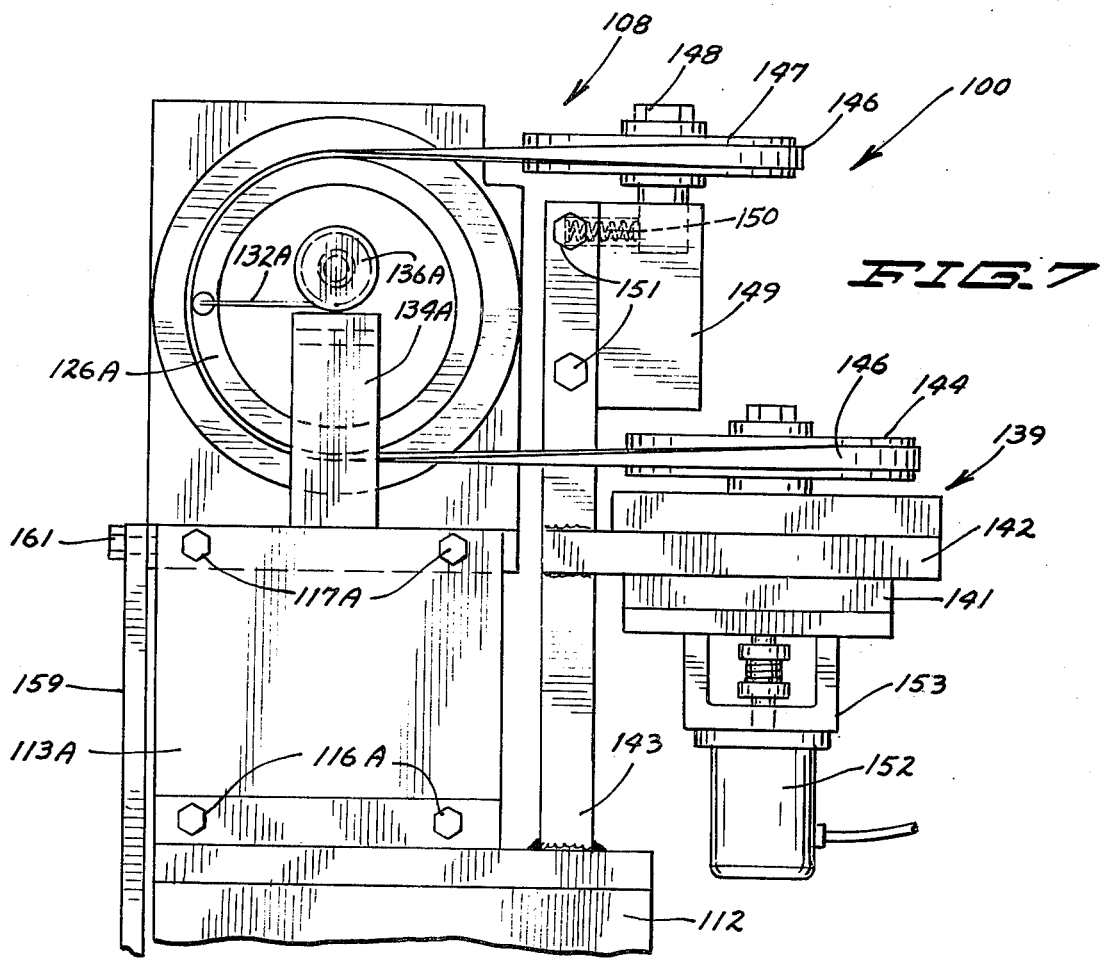
FIG. 7 is a side elevational view of FIG. 6.

A drive mechanism, indicated generally at 139 in FIGS. 6 and 7, operates to rotate the annular members 126 and 126A in opposite directions to wind wire onto the core 103. Drive mechanism 139 comprises an electric motor 141. Motor 141 is mounted on a support 142 located adjacent the tables 109 and 109A. Upright stands 143 secure the support 142 to the frame 112. Motor 141 drives a pulley 144 carrying an endless belt 146. The belt 146 is trained about annular members 126 and 126A and about an idler pulley 147. Idler pulley 147 is rotatably mounted on an upright axle 148. A block 149 holds axle 148 in an upright position. A spring 150 located in a groove in block 149 biases axle 148 in an outward direction to provide yieldable tension on belt 146. The spring 150 allows axle 148 to move toward units 107 and 108 when the units are spread apart. A plurality of nut and bolt assemblies 151 secure block 149 to the upper ends of stand 143. An encoder 152 is drivably coupled to the drive shaft of motor 141. A support 153 secures encoder 152 to the motor 141. Encoder 152 is electrically coupled to a control mechanism, such as a computer with its associated memory. The drive mechanism 139 and the chucks or guide structures 129 and 129A are disclosed in co-pending application Ser. No. 557,363 filed March 11, 1975. The structure and operation disclosed in this application are incorporated herein by reference.

Referring to FIG. 9, a control mechanism indicated generally at 154 is operable to move the wire winding units 107 and 108 away from each other so that the armature 101 can be removed from holder 104 after the winding procedure has been completed. Units 107 and 108 are held in their spread positions until a new unwound armature is placed in the holder 104 between the chucks 129 and 129A. The control mechanism 154 is then actuated to move view winding units 107 and 108 back to their initial holding positions, as shown in FIG. 9. Biasing means, as springs, (not shown) can be used to assist the return of units 107 and 108 to their initial positions. The plate beam assemblies 113, 118, 113A and 118A function to accurately position the units 107 and 108 in their initial positions and support the units in the initial positions.

Control mechanism 154 has a first plate member 157 secured with bolts 158 to the edge of table 109. A second plate member 159 is secured to the edge of table 109A with bolts 161. The members 157 and 159 extend in a downward direction and are located adjacent a power applying assembly 162. The power applying assembly 162 includes a member 163 pivotally mounted on a support 164 with a pin 166. Support 164 is attached to the support 112. A first link 167 is pivotally mounted to the upper end of member 163 with a pin 168. The opposite end of link 167 is attached with a pivot pin 169 to the lower portion of member 157. A second link 171 is pivotally mounted to a lower portion of member 163 with a pivot pin 172. The opposite or outer end of link 171 is connected with a pivot pin 173 to a lower portion of member 159. A fluid motor, as an air cylinder, indicated generally at 174 is operable to rotate member 163 and thereby move members 157 and 159 relative to each other, as shown by arrow 156. Fluid motor 174 has a double acting cylinder 176 attached to a bracket 177. The bracket 177 is secured to support 112. A piston rod 178 extends from cylinder 176 and is connected with a pivot pin 179 to the lower end of member 163. Other types of power applying assemblies can be used to move the members 157 and 159 relative to each other to move wire winding units 107 and 108 away from each other.

In use, the power applying assembly 162 is operated in sequence with the winding operation of the machine. The power applying assembly 162 is operable to rotate the member 163 and thereby apply opposite outwardly directed forces to members 157 and 158. These forces flex the plate beam assemblies 113, 118, 113A and 118A, thereby moving the wire winding units 107 and 108 away from each other. When the power on the power applying assembly 162 is released and reversed, the plate beam assemblies 113, 118 and 113A, 118A will reposition the units 107 and 108 back to their initial positions.

While there have been shown and described preferred embodiments of the invention, it is understood that changes in the use, size, materials and structures may be made by those skilled in the art without departing from the invention.

The embodiments of the invention in which an exclusive property or privilege is claimed are defined as follows:

1. An apparatus for winding coils of wire on a core of an armature comprising: means for supporting an armature having a core in a wire receiving position, means for winding wire onto the core of the armature, a support, flexure means mounting the means for winding wire onto the core on the support and positioning said means for winding wire onto the core in a wire winding position adjacent said core, and control means for moving the means for winding wire onto the core away from the core against the biasing force of the flexure means to facilitate removal of the armature from the means supporting the armature and move the means for winding wire onto the core into the winding position.

2. The apparatus of claim 1 wherein: the flexure means includes plate beam assembly means, first fastening means connecting the plate beam assembly means to the support, and second fastening means connecting the plate beam assembly means to the means for winding wire onto the core.

3. The apparatus of claim 2 wherein: the plate beam assembly means includes a plurality of side-by-side flat and flexible plate members.

4. The apparatus of claim 1 wherein: the means for winding wire onto the core includes a first wire winding mechanism and a second wire winding mechanism, first flexure means mounting the first mechanism on the support and second flexure means mounting the second mechanism on the support.

5. The apparatus of claim 4 wherein: each flexure means includes plate beam assembly means, first fastening means connecting the plate beam assembly means to the support, and second fastening means connecting the plate beam assembly means to one of the mechanisms.

6. The apparatus of claim 5 wherein: each plate beam assembly means includes a plurality of side-by-side flat and flexible plate members.

7. The apparatus of claim 4 wherein: each mechanism includes housing means, a rotatable member mounted on the housing means, means to rotate the rotatable member, said rotatable member having means operable to wind wire onto the core, fastening means connecting the flexure means to the housing means, and said control means being connected to said housing means and operable to move the housing means and means operable to wind wire away from the core.

8. The apparatus of claim 7 wherein: said housing means includes a first block and a second block, bearing means mounted on said first and second blocks rotatably supporting the rotatable member, said flexure means including a first plate beam assembly connecting the first block to the support and a second plate beam assembly connecting the second block to the support.

9. The apparatus of claim 8 wherein: each plate beam assembly includes a plurality of side-by-side flat and flexible plate members.

10. The apparatus of claim 8 wherein: the control means includes a plate connected to the first block and the second block of each mechanism, a movable member movably mounted on the support, link means connecting the movable member to each plate, and motor means connected to the movable member and operable to move the movable member whereby force is transmitted through the link means to the plates to move the housing means away from the armature and flex the first and second plate spring assemblies of each mechanism.

11. The apparatus of claim 1 wherein: the control means includes a movable member, means connecting the movable member to the means for winding wire onto the core, and motor means connected to the movable member and operable to move the movable member.

12. The apparatus of claim 1 wherein: the means for winding wire onto the core includes a first wire winding mechanism and a second wire winding mechanism, each wire winding mechanism having a table, a housing mounted on the table, a rotatable member rotatably mounted on the housing, means to rotate the rotatable member, said rotatable member having means operable to wind wire onto the core, fastening means connecting the flexure means to the table, and means connecting the control means to said table, said control means operable to move the table and means operable to wind wire away from the core.

13. The apparatus of claim 12 wherein: the rotatable member comprises an annular member rotatably mounted on the housing, and wire guiding means mounted on the rotatable member.

14. The apparatus of claim 12 wherein: the flexure means includes a first plate beam assembly connected to the table and a second plate beam assembly connected to the table.

15. The apparatus of claim 14 wherein: each plate beam assembly includes a plurality of side-by-side flat and flexible plate members.

16. The apparatus of claim 12 wherein: said means to rotate the rotatable member of the first wire winding mechanism and the rotatable member of the second wire winding mechanism includes a motor, and an endless belt drivably connecting the motor with both rotatable members, said belt being slackened when the rotatable members are moved away from the core to release positions by operation of the control means and placed under operating tension without loss of belt timing when the rotatable members are moved from the release positions to wire winding positions adjacent the core.

17. The apparatus of claim 16 wherein: the rotatable members are annular ring-like members rotatably mounted on the housing.

18. The apparatus of claim 12 wherein: the flexure means connected to each table and support includes a first pair of flexible members secured to one table and the support and a second pair of flexible members secured to the other table and the support.

19. The apparatus of claim 18 wherein: the flexible members are flexible plate members.

20. The apparatus of claim 1 wherein: the control means includes means to bias the means for winding wire onto the core to the winding position.

21. The apparatus of claim 1 wherein: the flexure means has a pair of flexible members secured to the support and means for winding wire onto the core.

22. The apparatus of claim 21 wherein: the flexible members are flexible plate members.

23. An apparatus for winding coils of wire on the core of an armature comprising: means for supporting an armature having a core in a wire receiving position, a support, a first mechanism located on one side of the core and operable to wind a coil of wire on the core, a second mechanism located on the opposite side of the core and operable to wind a coil of wire on the core, first flexure means mounting the first mechanism on the support, second flexure means mounting the second mechanism on the support, said first and second flexure means positioning said first and second mechanisms adjacent the core of the armature in wire winding positions, and control means connected to the first mechanism and the second mechanism for moving the mechanisms away from the core against the biasing forces of the first flexure means and second flexure means to facilitate the removal of the armature from the means supporting the armature and move the mechanisms to wire winding positions.

24. The apparatus of claim 23 wherein: each flexure means includes plate beam assembly means and fastening means connecting the plate beam assembly means to the support and to one mechanism.

25. The apparatus of claim 24 wherein: the plate beam assembly means includes a plurality of side-by-side flat and flexible plate members.

26. The apparatus of claim 23 wherein: each mechanism includes housing means, a rotatable member mounted on the housing means, means to rotate the rotatable member, said rotatable member having means operable to wind wire onto the core, and fastening means connecting one flexure means to the housing means.

27. The apparatus of claim 26 wherein: said housing means includes a first block and a second block, bearing means mounted on said first and second blocks rotatably supporting the rotatable member, said flexure means including a first plate beam assembly connecting the first block to the support and the second plate beam assembly connecting the second block to the support.

28. The apparatus of claim 27 wherein: the first plate beam assembly each includes a plurality of side-by-side flat and flexible plate members.

29. The apparatus of claim 23 wherein: said control means includes means connected to said housing means and operable to move the housing means and means operable to wind wire away from the core.

30. The apparatus of claim 23 wherein: each mechanism includes a table, a housing secured to the table, a rotatable member mounted on the housing, means to rotate the rotatable member, said rotatable member having means operable to wind wire onto the core, one of said flexure means being secured to each table.

31. The apparatus of claim 30 wherein: said flexure means includes a first beam spring assembly connected to the table and a second beam spring assembly connected to the table.

32. The apparatus of claim 31 wherein: each plate beam assembly includes a plurality of side-by-side flat and flexible plate members.

33. The apparatus of claim 23 wherein: the control means includes a movable member, first means connecting the first mechanism to the movable member, second means connecting the second mechanism to the movable member, and motor means connected to the movable member and operable to move the movable member in a direction to move the first and second mechanisms away from the core.

34. The apparatus of claim 23 wherein: the control means includes means to bias the mechanisms to wire winding positions.

35. The apparatus of claim 23 wherein: the first mechanism has a first rotatable member having means for accommodating wire and the second mechanism has a second rotatable member having means for accommodating wire, and drive means connected to the first and second rotatable members to rotate said first and second rotatable members to wind wire on the core.

36. The apparatus of claim 35 wherein: the drive means includes a motor and an endless belt drivably connecting the motor with both the first and second rotatable members, said belt being slackened when the rotatable members are moved away from the core to release positions by operation of the control means and placed under operating tension without loss of belt timing when the rotatable members are moved from the release positions to wire winding positions adjacent the core.

37. The apparatus of claim 35 wherein: the rotatable members are annular ring-like members.

38. The apparatus of claim 23 wherein: said first flexure means includes a first pair of flexible members and the second flexure means includes a second pair of flexible members.

39. The apparatus of claim 38 wherein: the flexible members of each pair of flexible members are flexible plate members.

40. An apparatus for positioning an object in a location comprising: means for holding an object including a first means for engaging one part of an object and a second means for engaging a second part of an object, a support, first flexure means mounting the first means on the support, second flexure means mounting the second means on the support, said first and second flexure means each having at least a pair of flexible members, and means securing the flexible members to the support and first and second means, and control means connected to the first and second means operable to move said first and second means relative to each other to release positions spaced from the object, said control means being operable to move the first and second means relative to each other to first positions adjacent the object to hold the object and operable to move the first and second means away from the object to release the object.

41. The apparatus of claim 40 wherein: said control means includes a first plate connected to the first means, a second plate connected to the second means, and power means operably connected to the first plate and second plate operable to move said first and second plates relative to each other in a first direction to move the first and second means to their release positions and operable to move in a second direction to move the first and second means to positions adjacent the object.

42. The apparatus of claim 40 wherein: each of said plate beams includes a plurality of side-by-side flat and flexible plate members.

43. The apparatus of claim 40 wherein: said control means includes a first plate connected to the first means, a second plate connected to the second means, a movable member movably mounted on the support, link means connecting the movable member to the first and second plates, and motor means connected to the movable member and operable to move the movable member whereby force is transmitted through the link means to the first and second plates to move the first and second means to their respective release positions and flex the flexible plate beams.

44. The apparatus of claim 43 wherein: each of said plate beams includes a plurality of side-by-side flat and flexible plate members.

45. An apparatus for positioning an object in a location comprising: means for holding an object including a first mechanism having first means for engaging one part of an object and a second mechanism having second means for engaging a second part of the object, a support, flexure means including first plate beam assembly means mounting the first mechanism on the support and second plate beam assembly means mounting the second mechanism on the support, and control means connected to the first mechanism and the second mechanism operable to move the first and second mechanisms away from each other to object release positions thereby releasing the object from the first means and second means, said control means including a first plate connected to the first mechanism, a second plate connected to the second mechanism, a movable member movably mounted on the support, link means connecting the movable member to the first and second plates, and motor means connected to the movable member and operable to move the movable member whereby force is transmitted through the link means to the first and second plates to move the first and second mechanisms away from each other to object release positions and flex the first and second plate beam assembly means.

46. An apparatus for positioning an object in a location comprising: means for holding an object including a first mechanism having first means for engaging one part of an object and a second mechanism having second means for engaging a second part of the object, a support, flexure means including first plate beam assembly means mounting the first mechanism on the support and second plate beam assembly means mounting the second mechanism on the support, and control means connected to the first mechanism and the second mechanism operable to move the first and second mechanisms away from each other to object release positions thereby releasing the object from the first means and second means, said first mechanism having first rotatable means, said second mechanism having second rotatable means, a motor operable to rotate the first and second rotatable means, an endless belt drivably connecting the motor and the first and second rotatable means, said belt being slackened when the first and second mechanisms are moved away from each other to object release positions, and said belt is placed under operating tension without loss of belt timing when the first and second means are returned to their object engaging positions.

47. The apparatus of claim 46 wherein: the control means includes means to bias the first and second mechanisms to their object engaging positions.

48. An apparatus for positioning an object in a location comprising: means for holding an object, a support, flexure means mounting the means for holding an object on the support, said flexure means including a plurality of plate beam assemblies, each of said plate beam assemblies including a plurality of side-by-side flat and flexible plate members, means securing the plate members to the support and to the means for holding an object, and control means connected to the means for holding an object operable to move said means for holding an object to a release position spaced from the object, said control means being operative to move the means for holding an object to a first position adjacent the object.

49. The apparatus of claim 48 wherein: the means for holding an object includes a first mechanism having first means for engaging one part of an object and a second mechanism having second means for engaging a second part of an object, said flexure means being attached to the first mechanism and second mechanism, and said control means being connected to the first mechanism and second mechanism and operable to move the first and second mechanisms away from each other to release the object from the first and second means.

50. The apparatus of claim 49 wherein: said control means includes a first plate connected to the first mechanism, a second plate connected to the second mechanism, and power means connected to the first plate and second plate operable to move the first mechanism and second mechanism relative to each other to selectively locate the first means and second means in their object holding positions and object release positions.

51. The apparatus of claim 49 wherein: said power means includes a movable member movably mounted on the support, link means connecting the movable member to the first and second plates, and motor means connected to the movable member and operable to move the movable member whereby force is transmitted through the link means to the first and second plates to move the first and second mechanisms relative to each other.

* * * * *

UNITED STATES PATENT AND TRADEMARK OFFICE
CERTIFICATE OF CORRECTION

PATENT NO. : 3,980,243
DATED : September 14, 1976
INVENTOR(S) : David A. Schulman It is certified that error appears in the above-identified patent and that said Letters Patent are hereby corrected as shown below:

In references cited, first reference should be --157,293--.

Column 3, line 40, "40" should be --30--.

Column 3, line 56, "27" should be --37--.

Column 7, line 50, "view" should be --wire--.

Signed and Sealed this

First Day of February 1977

[SEAL]

Attest:

RUTH C. MASON
Attesting Officer

C. MARSHALL DANN
Commissioner of Patents and Trademarks